(12) United States Patent
Oeser et al.

(10) Patent No.: US 12,304,619 B2
(45) Date of Patent: May 20, 2025

(54) METHOD FOR APPLYING AN AERODYNAMICALLY FUNCTIONAL FILM

(71) Applicant: Lufthansa Technik AG, Hamburg (DE)

(72) Inventors: Oliver Oeser, Borstel-Hohenraden (DE); Thorsten Gerber, Hamburg (DE); Kai-Christoph Pfingsten, Hamburg (DE); Dominik Brost, Hamburg (DE); Darius Klein, Hamburg (DE); Holger Rathmann, Sehnde (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 245 days.

(21) Appl. No.: 17/780,529

(22) PCT Filed: Nov. 27, 2020

(86) PCT No.: PCT/EP2020/083564
§ 371 (c)(1),
(2) Date: May 27, 2022

(87) PCT Pub. No.: WO2021/105316
PCT Pub. Date: Jun. 3, 2021

(65) Prior Publication Data
US 2023/0348046 A1  Nov. 2, 2023

(30) Foreign Application Priority Data

Nov. 28, 2019  (DE) ..................... 10 2019 132 347.9

(51) Int. Cl.
*B64C 21/10* (2006.01)
*B64C 1/00* (2006.01)
*F15D 1/12* (2006.01)

(52) U.S. Cl.
CPC ................ *B64C 21/10* (2013.01); *B64C 1/00* (2013.01); *F15D 1/12* (2013.01); *B64C 2230/26* (2013.01)

(58) Field of Classification Search
CPC ....... B64C 21/10; B64C 2230/26; B64C 1/00; F15D 1/12; F15D 1/0035; F15D 1/004;
(Continued)

(56) References Cited

U.S. PATENT DOCUMENTS

| 8,460,779 B2 | 6/2013 | Gupta et al. |
| 2011/0073710 A1* | 3/2011 | Rawlings ............ B29C 65/4855 264/224 |

(Continued)

FOREIGN PATENT DOCUMENTS

AT  508274 A1 * 12/2010 ............. B64C 21/10

OTHER PUBLICATIONS

ORAFOL Europe GmbH, "Processing Guidelines: ORAFOL® Films for Aircraft Applications," Jun. 7, 2016, pp. 1-4. (Year: 2016).*
Szodruch, "Viscous drag reduction transport aircraft," 29th Aerospace Sciences Meeting, Jan. 1, 1991, pp. 1-8, Aerospace Research Central (ARC), Reno, Nevada, USA.
(Continued)

*Primary Examiner* — Philip C Tucker
*Assistant Examiner* — Brian R Slawski
(74) *Attorney, Agent, or Firm* — LEYDIG, VOIT & MAYER, LTD.

(57) ABSTRACT

A method applies aerodynamically functional film to a body around which complex flow occurs. The method includes: determining flow lines on a surface of the body for a predetermined surrounding flow state on a basis of a computer model of the body using a numerical flow simulation; developing at least one surface segment of the computer model provided with flow lines to form a two-dimensional surface; locating at least one coherent field in the developed surface segment having local flow directions readable at the flow lines in a predetermined angle range around a main (Continued)

flow direction of the respective field; and applying the aerodynamically functional film to the body within the field boundary of the at least one field located in the developed surface segment in such a way that the aerodynamically functional film is aligned along the main flow direction of the respective field.

14 Claims, 5 Drawing Sheets

(58) Field of Classification Search
CPC ........ F15B 19/007; Y02T 50/10; B29C 65/00; B29C 65/48; B29C 65/50; B29C 65/5057; B29C 66/301
USPC ...... 156/60, 64, 71, 297, 299; 428/156, 161, 428/163, 167; 244/130, 200, 198, 200.1
See application file for complete search history.

(56) References Cited

U.S. PATENT DOCUMENTS

| | | | |
|---|---|---|---|
| 2011/0262705 A1* | 10/2011 | Gupta | B64C 21/10 428/156 |
| 2017/0167510 A1* | 6/2017 | Berschback | F04D 29/325 |
| 2017/0234134 A1* | 8/2017 | Bunker | F04D 29/542 415/208.2 |

OTHER PUBLICATIONS

Walsh, et al., "Riblet Drag at Flight Conditions," Journal of Aircraft, vol. 26, No. 6, Jun. 1, 1989, pp. 570-575, American Institute of Aeronautics and Astronautics, Washington DC, USA.
Orafol, "Verarbeitungsrichtlinien ORAFOL Folien für Luftfahrtanwendungen," https://www.orafol.com/products/europe/de/application-instructions/VH14-aircraft-eu-application-de.pdf, Jun. 7, 2016, pp. 1-11, ORAFOL Europe GmbH, Oranienburg, Germany.

* cited by examiner

METHOD FOR APPLYING AN AERODYNAMICALLY FUNCTIONAL FILM

CROSS REFERENCE TO RELATED APPLICATIONS

This application is a U.S. National Phase application under 35 U.S.C. § 371 of International Application No. PCT/EP2020/083564, filed on Nov. 27, 2020, and claims benefit to German Patent Application No. DE 10 2019 132 347.9, filed on Nov. 28, 2019. The International Application was published in German on Jun. 3, 2021 as WO 2021/105316 A1 under PCT Article 21(2).

FIELD

The present disclosure relates to a method for applying aerodynamically functional film to a body around which complex flow occurs, for example on a commercial aircraft.

BACKGROUND

Aerodynamically functional films are generally used to reduce the wall shear stress on surfaces of bodies around which flow occurs. The aerodynamically functional films generally have a microstructured surface, having one or more preferred directions for this purpose. A preferred direction refers here to a preferred overflow direction (thus the direction of the local flow on the surface), in which the reduction of the wall shear stress is particularly high or even maximal.

One widespread microstructure is the so-called riblet structure, having very small ribs extending essentially along the preferred direction. Riblet structures are thus found, for example, on external surfaces of aircraft, but also on rotor blades of wind turbines, on the outer skin of ships, or on outer surfaces of high-speed trains.

In order that the most extensive possible reduction of the wall shear stress can be achieved by aerodynamically functional films, and in particular riblet structures, the film is aligned having its preferred direction as exactly as possible in or only with minor deviations in relation to the local flow direction—thus that direction in which the overflow of the surface is primarily to be expected in the region of the film.

Aerodynamically functional films have heretofore been arranged practically exclusively on those surfaces of a body around which flow occurs which have a less complex, generally nearly uniform flow profile, for which the flow direction and thus the preferred direction result practically inevitably. Examples of such surfaces are the outer skin of high-speed trains having flow direction corresponding to the travel direction or the upper side of wings of an aircraft or of blades of a wind turbine, in which the flow direction primarily extends in the profile direction.

SUMMARY

In an embodiment, the present disclosure provides a method for applying aerodynamically functional film to a body around which complex flow occurs. The method includes: determining flow lines on a surface of the body around which flow occurs for a predetermined surrounding flow state on a basis of a computer model of the body using a numerical flow simulation; developing at least one surface segment of the computer model provided with flow lines to form a two-dimensional surface; locating at least one coherent field in the developed surface segment having local flow directions readable at the flow lines in a predetermined angle range around a main flow direction of the respective field; and applying the aerodynamically functional film to the body around which flow occurs within the field boundary of the at least one field located in the developed surface segment in such a way that the aerodynamically functional film is aligned along the main flow direction of the respective field.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

To reduce the flow resistance of a body around which flow occurs as extensively as possible, it is desirable in principle to provide aerodynamically functional films reducing the wall shear stress on those surfaces of the body in which a more complex flow profile is present. In commercial aircraft of known configuration, one such region is present, for example, on the outer skin of the aircraft fuselage in the region of the wing roots.

According to the prior art, however, aerodynamically functional films can only be aligned in corresponding regions in the direction of suspected flow directions. However, a corresponding arrangement of aerodynamically functional films in the region of more complex flow profiles on the surface of bodies around which flow occurs is often not accompanied by a sufficiently large reduction of the wall shear stress, which would justify the effort of the application of the aerodynamically functional film. As a result, the application of aerodynamically functional film is actually regularly restricted to regions of the surface of a body around which flow occurs having less complex or even nearly uniform flow profile.

In an embodiment, the present disclosure provides a method for applying aerodynamically functional film to a body around which complex flow occurs, in which the wall shear stress can also be effectively reduced in regions having more complex flow profile.

The present disclosure accordingly relates to a method for applying aerodynamically functional film to a body around which complex flow occurs, in particular on a commercial aircraft, having the following steps:

determining the flow lines on the surface of the body around which flow occurs for a predetermined surrounding flow state on the basis of a computer model of the body with the aid of numerical flow simulation;

developing at least one surface segment of the computer model provided with flow lines to form a two-dimensional surface;

locating at least one coherent field in the developed surface segment having local flow directions readable on the flow lines in a predetermined angle range around a main flow direction of the respective field; and applying and possibly trimming aerodynamically functional film to the body around which flow occurs within the field boundary of the at least one field located in the developed surface segment in such a way that the aerodynamically functional film is aligned having a preferred direction along the main flow direction of the respective field.

Firstly, several terms used in conjunction with the present disclosure will be explained.

A "body around which complex flow occurs" is a body in which due to the shaping of the body a complex flow profile results along the surface at least in sections of the surface of the body even if the body is in a parallel flow.

A "complex flow profile" is a flow profile along a surface section which cannot be reasonably approximated by a parallel flow profile.

The present inventors have recognized that, even in surface regions of a body around which flow occurs having complex flow profile, generally a suitable arrangement of known aerodynamically functional films, in particular those having riblet structure, may be determined, which results, after corresponding application of the film, in a noticeable and worthwhile reduction of the wall shear stress. Aspects of the present disclosure take into consideration both that the body around which flow occurs is often also formed geometrically complexly in the regions of complex flow profiles, and also that aerodynamically functional film is regularly designed for a main flow direction remaining uniform over the film surface. Thus, for example, riblet film fundamentally has a uniform design and alignment of the individual riblets over the entire film.

In a first step of the method according to an aspect of the present disclosure, the surrounding flow of the body to which the aerodynamically functional film is ultimately to be applied is determined with the aid of an arbitrary flow simulation (from "computational fluid dynamics (CFD) simulation"). For this purpose, a surrounding flow state is predetermined for which the ultimate reduction of the wall shear stress is desired, for example, because the surrounding flow state in question occurs most often or the flow resistance or the wall shear stress is particularly high in the surrounding flow state in question. If the body around which flow occurs is, for example, a commercial aircraft, the surrounding flow in cruise flight is generally predetermined as the surrounding flow state.

The flow simulation is furthermore based on a computer model of the body around which flow occurs which maps the geometry of the body. Corresponding computer models are either directly available in a plurality of typical areas of application of the present disclosure, for example, in aviation, or may be derived directly from other available digital design data.

From the simulation of the surrounding flow of the computer model of the body around which flow occurs in the predetermined surrounding flow state, inter alia, flow lines result on the surface of the computer model of the body which each represent the local flow direction along the surface of the body, thus in particular the direction of the flow inducing the wall shear stress. The determination of the flow lines on the surface of bodies around which flow occurs with the aid of flow simulation is well known from the prior art.

In a next step, at least a part of the surface of the computer model of the body around which flow occurs provided with flow lines—namely a selected surface segment—is developed to form a two-dimensional surface. By way of the development of the surface of a body known from the representational geometry, a nearly arbitrarily complex surface geometry is transferred into a plane in which the distance between two points of the developed surface corresponds to the measurable length distance between these two points along the surface in the three-dimensional representation. In the case of very complex geometries, developing is possibly only possible with regional overlap in the plane. Although various possibilities may be used for how to deal with such overlap regions, it is preferred to select the surface segment in such a way that its Gaussian curvature is zero everywhere or the surface segment forms a surface which can be developed without problems. In any case, the development is to take place without distortion.

The development is used according to an aspect of the present disclosure not only to transfer the geometry of the selected surface segment into a plane, but also the flow lines arranged thereon, so that as a result a two-dimensional flow picture of the selected surface segment results.

On the basis of the development of the body surface together with the flow lines, at least one coherent field—thus a continuous region without internal gaps—is then located, in which the local flow directions at each point of the field are within a predetermined angle range around a main flow direction established for the field. In the case of aerodynamically functional film, a satisfactory reduction of the wall shear stress is also regularly provided even if the flow direction of the overflow slightly deviates entirely or only in sections from the main flow direction. Such a permissible deviation can be taken into consideration by the predetermined angle range corresponding to the properties of the provided aerodynamically functional film.

Locating at least one field according to the specifications is in particular easy to implement and is to be carried out with acceptable effort because the process is supported on the surface segment, including the flow lines, developed in a two-dimensional plane.

The at least one field located on the basis of the two-dimensional development is then used to apply aerodynamically functional film to the body around which flow occurs. For this purpose, the aerodynamically functional film, which in principle has a preferred direction with respect to the overflow in relation to a plane (in the case of riblet film, for example, the longitudinal direction of the riblets), is applied according to the main flow direction of the field in question within the field boundary on the body around which flow occurs.

In this case, the application of the aerodynamically functional film takes place, of course, on the three-dimensional body having arbitrary geometry. Since both the field boundary and also the main flow direction have been produced on the basis of the two-dimensional development, which is ultimately equivalent to the formation of the aerodynamically functional structure of the film, when the field boundary and the main flow direction are transferred back to the actual body around which flow occurs and the aerodynamically functional film is applied oriented in a preferred direction thereon, it is ensured that the local flow direction deviates at each point of the film by not more than the predetermined angle range from the preferred direction of the aerodynamically functional film. The fundamentally two-dimensionally formed film adapts upon application to the three-dimensional surface of the body so that it remains ensured even in more complex surface formations of the body that the local flow directions deviate over the entire field or the film applied therein by not more than the predetermined angle range from the preferred direction of the aerodynamically functional film.

To facilitate the ultimate application and possible trimming of the aerodynamically functional film to the body in accordance with the field boundaries and main flow directions determined in the two-dimensional development, it is preferred if the field boundaries and main flow directions are selected in accordance with alignment lines identifiable on the body.

The "identifiable alignment lines" can be structural features of the surface of the body, for example, edges or gaps in the surface of the body. An alignment line is also identifiable, however, if only two discrete points are uniquely identifiable on the alignment line, which can then be marked on the body, for example, with the aid of guidelines or adhesive tapes. Corresponding points of an alignment line can be formed, for example, by structural features of the surface of the body such as drilled holes, screws, rivets, or the like.

In order that the field boundaries and main flow directions can be selected in accordance with alignment lines identifiable on the body on the basis of structural features of the surface of the body, it is preferred that the corresponding alignment lines and/or the discrete points for forming the alignment lines are contained in the computer model of the body, so that they can be taken into consideration according to the specifications when locating fields in the surface segment.

Alternatively or additionally to identifiable alignment lines on the basis of structural features of the surface of the body, at least a part of the alignment lines can also be identified on the basis of a geometrically calibrated pattern projected on the body. In the case of a corresponding geometrically calibrated projection, for example, an alignment line can be projected on the surface of the body with the aid of a projector, the location and alignment of which in relation to the surface of the body are exactly determined or predetermined, wherein the accurate course of the alignment line is determined on the basis of the computer model of the body and the two-dimensional development for the projection. Alternatively, it is also possible to project a repeating pattern—for example a rectangular pattern—in accordance with the developed surface segment on the surface of the body, which takes into consideration the geometry of the body. The ultimate alignment lines can then be identified on the basis of the projected pattern.

It is furthermore preferred if the main flow direction of a field is selected in parallel to an alignment line for a field boundary of the field. In this case, the aerodynamically functional film can be applied starting from just this field boundary in the correct alignment on the body, without a separate alignment line also having to be determined and/or taken into consideration for the main flow direction.

To make the application and the possible trimming of the aerodynamically functional film simple, it is preferred if the field boundaries of at least one field on the developed surface segment are straight lines and preferably form a closed traverse having at most 8, preferably at most 6, more preferably having 4 sides. The latter limits the number of the alignment lines to be located for the ultimate application of the aerodynamically functional film on the body to an amount which can be handled well. If a field boundary on the two-dimensional surface is a straight line, it may be located without problems—as described above—via only two identifiable discrete points on the body.

Although it is obviously not required, the linear formation of the field boundaries in the two-dimensional development can also be advantageous for the preferred provision of one or more knifeless tapes along the alignment line of at least one field boundary of the field before the ultimate application of the aerodynamically functional film. These knifeless tapes are generally narrow adhesive strips having integrated tension cords. The adhesive strips are applied along the desired cutting edge on a surface before the film is adhesively bonded over them. By pulling the tension cord perpendicularly to the surface, both the adhesive strip of the knifeless tape and also the film lying above it is severed exactly along the desired cutting edge. The parts of the film which are not required and the remainder of the adhesive strip of the knifeless tape can subsequently be removed so that only the film in the desired region and having the desired cutting edge remains on the surface. Using corresponding knifeless tapes along the alignment line of a field boundary of the field, the aerodynamically functional film can be trimmed exactly to the desired field.

The latter can be significant in particular if—as preferred—the aerodynamically functional film is applied in at least one field in the form of film sections like tiles. An aerodynamically functional film is often provided fabricated in sizes which can be handled well, but which can be (significantly) smaller than a located field to be provided with film. In this case, multiple film sections can be applied in the located field adjacent to one another and adjoining one another—thus like tiles—wherein the individual film sections can be aligned correctly in that a second film section is aligned upon application to a first adjacent, already applied film section. The ultimate trimming of the parts of individual film sections possibly protruding beyond the field boundaries can take place, for example, via knifeless tapes along the alignment line of a field boundary of the field (see above).

It is preferred if the predetermined angle range is ±7° or less, preferably ±5° or less, more preferably ±3° or less. Corresponding angle ranges often provide a good compromise between the size of the fields which can be located and the effectiveness of the film, thus in particular the reduction of the wall stress, in the majority of possible aerodynamically functional films.

In the method according to an aspect of the present disclosure, at least two, preferably adjoining fields are preferably located in the surface segment. It is furthermore preferred if sufficiently many fields are located that the predetermined surface segment is completely filled with fields.

The aerodynamically functional film preferably has a riblet structure. In other words, the aerodynamically functional film is preferably a riblet film, the preferred direction of which extends in parallel to the longitudinal extension of the ribs.

As already mentioned, the method according to an aspect of the present disclosure is particularly suitable for applying aerodynamically functional films to a commercial aircraft, for example, in the fuselage region of an aircraft.

In the exemplary embodiment explained hereinafter, the application of an aerodynamically functional film having a microstructured surface in the form of riblets to a fuselage section of a commercial aircraft above the root of a wing using the method according to an aspect of the present disclosure is explained by way of example.

At the beginning of the method, that region is determined on the real commercial aircraft in which the aerodynamically functional film is to be applied. A surface segment 3 is then selected on the basis of a computer model 1 of the commercial aircraft in question which corresponds to the region 2 in question or at least comprises it.

Figure 1:
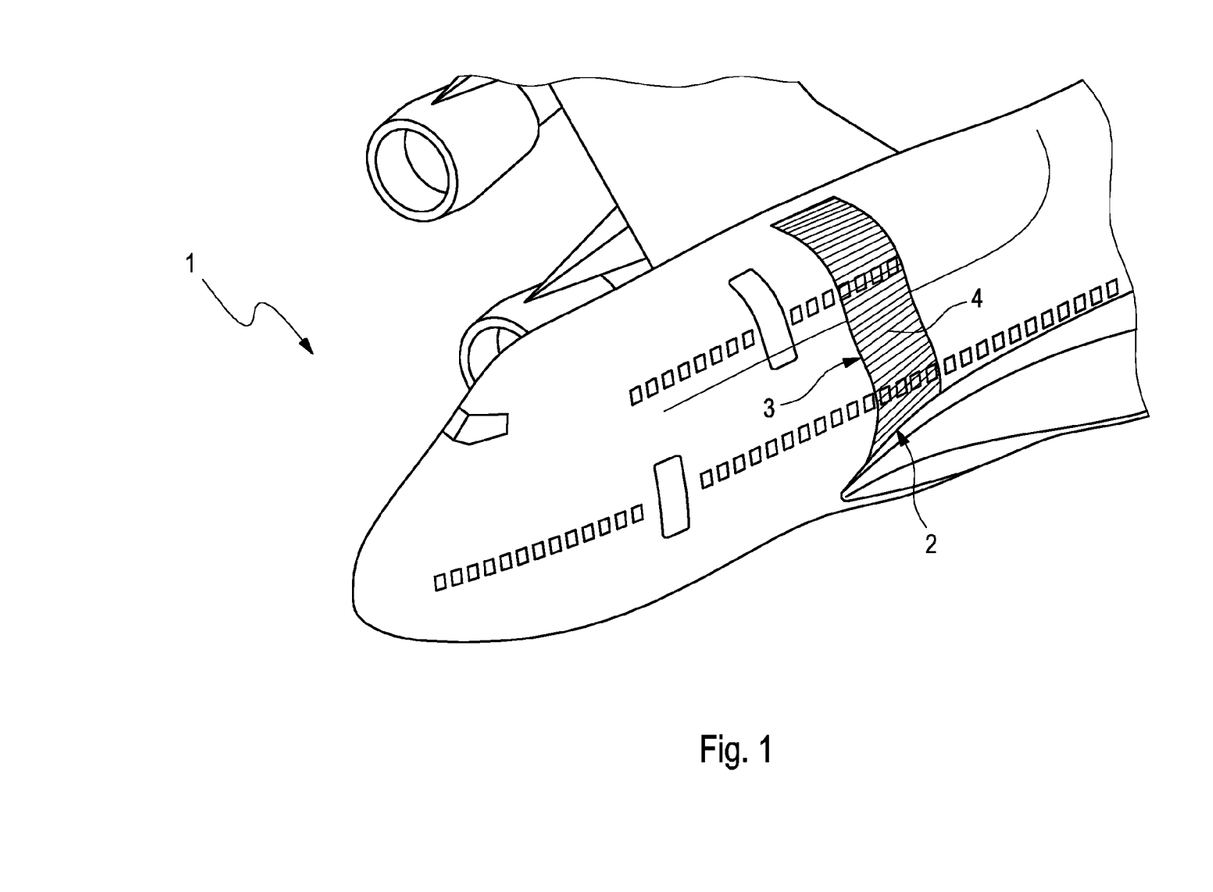
FIG. 1 illustrates a computer model of a commercial aircraft on which an aerodynamically functional film is to be applied.

The surface segment 3 is supplemented in the computer model 1 using flow lines 4 on the basis of a flow simulation carried out immediately beforehand. In the flow simulation, the surrounding flow of the computer model 1 of the aircraft is determined in a predetermined surrounding flow state—here during cruise flight at the typical cruise altitude of the commercial aircraft—from which, inter alia, flow lines 4 on the surface of the body around which flow occurs may be derived, which reflect the local flow direction of the flow ultimately relevant for the wall shear stress. It is also possible to make use of the results of a flow simulation carried out for other reasons at a significantly earlier time than the application of the method according to an aspect of the present disclosure. It is also possible to carry out the flow simulation only after selecting the surface segment 3, wherein then at least the determination of the flow lines can be limited to the surface segment 3 to possibly save computing power.

The result of these steps is shown in FIG. 1.

Figure 2:
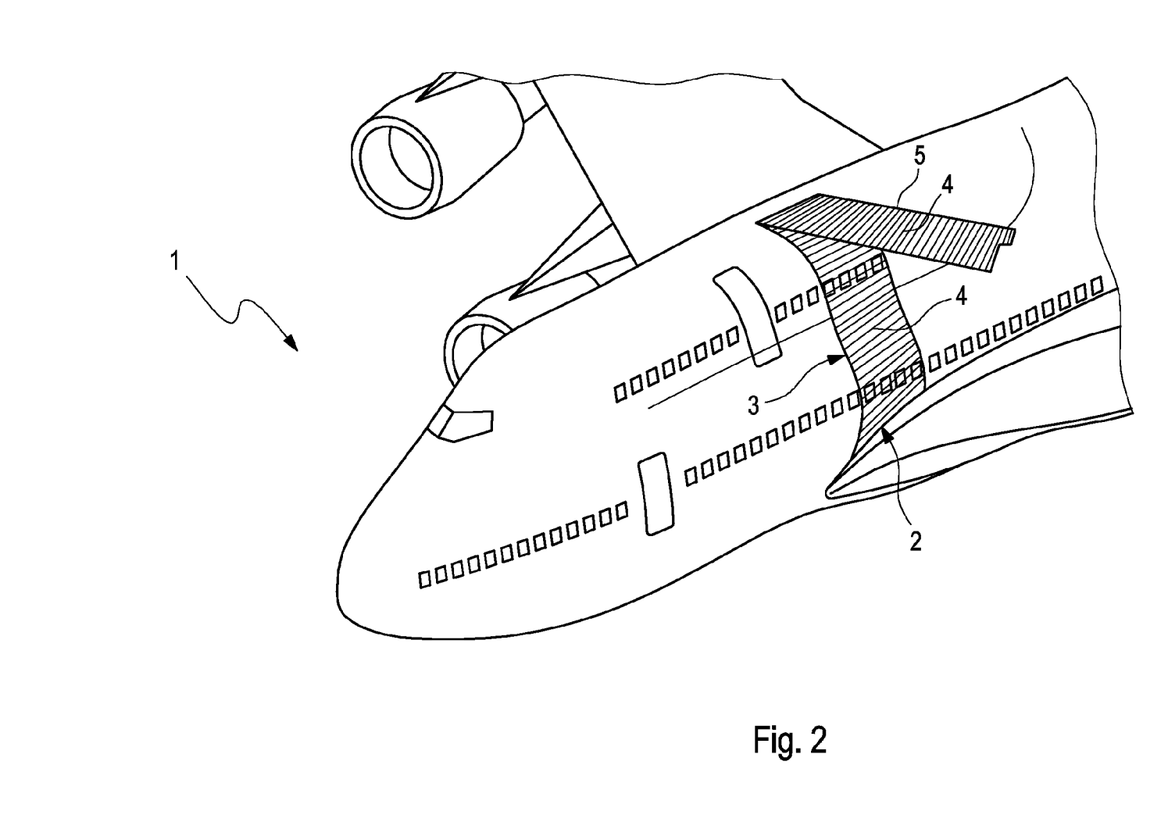
FIG. 2 illustrates forming a two-dimensional surface for the aerodynamically functional film as part of a method according to an aspect of the present disclosure.

The surface segment 3 is subsequently—as outlined in FIG. 2—developed together with the flow lines 4 to form a two-dimensional surface 5, so that the flow lines 4—in developed form—are also contained in the two-dimensional surface 5. Direct points which are identifiable directly on the real aircraft are also contained on the two-dimensional surface 5. In the present case, the two-dimensional surface 5 comprises the positions 6 of rivets recognizable on the outer skin of the real aircraft (cf. FIG. 3). The positions 6—if they are already contained on the computer model 1—can also be developed comparably to the flow lines 4 during the development of the surface segment 3. Alternatively, it is possible to add the positions 6 later to the developed two-dimensional surface 5 on the basis of design drawings of the aircraft.

Figure 3:
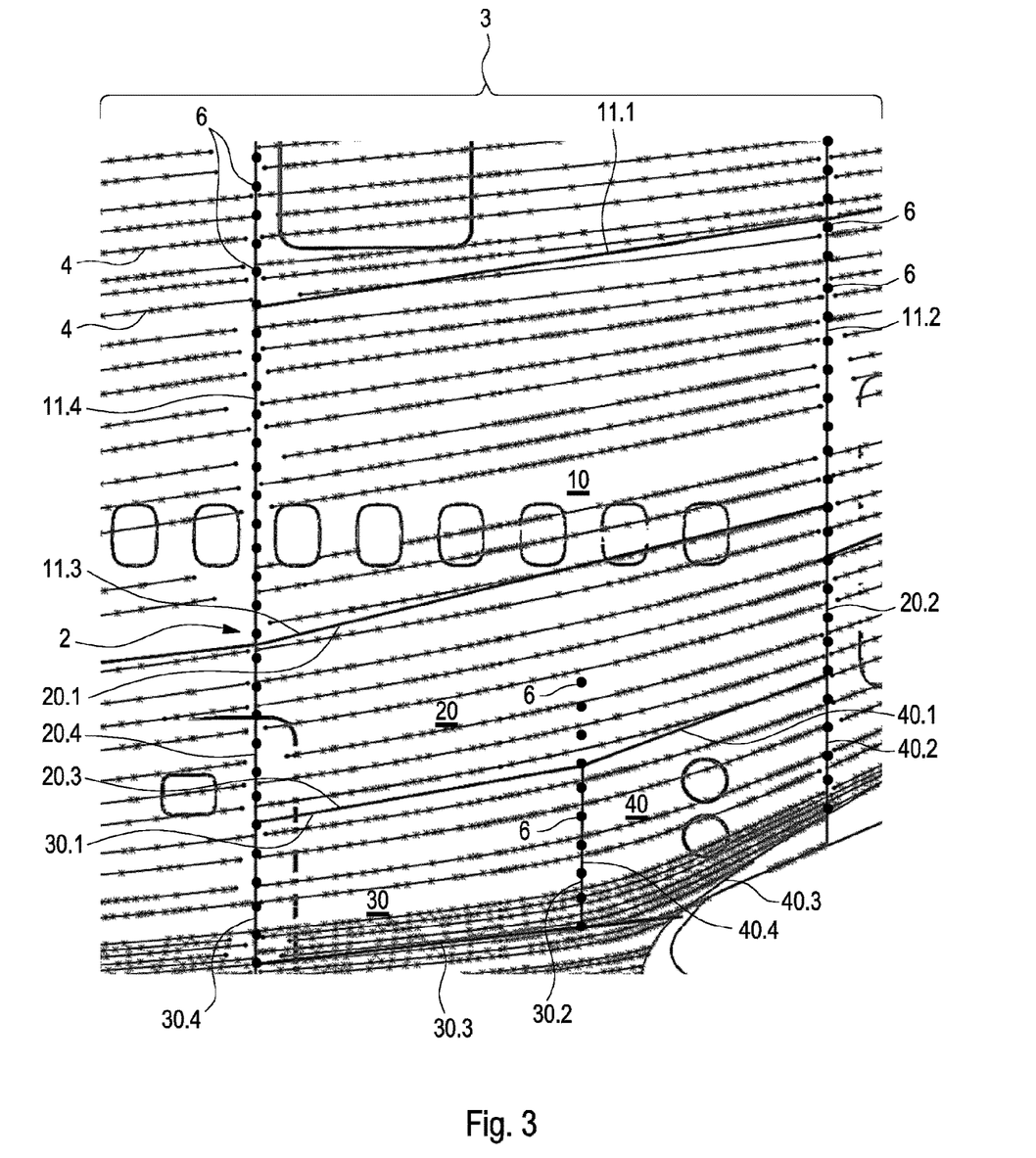
FIG. 3 illustrates a section of a developed surface segment, together with flow lines, to be provided with aerodynamically functional film.

FIG. 3 shows a section of the developed surface segment 3 together with the flow lines 4 and the positions 6 of the rivets which comprises the region 2 to be provided with aerodynamically functional film.

For this region 2, fields 10, 20, 30, 40 are determined in each of which local flow directions readable at the flow lines 4 deviate by less than ±5° from a main flow direction predetermined for each field 10, 20, 30, 40.

The fields 10, 20, 30, 40, the number of which is selected so that the region 2 is completely covered by fields 10, 20, 30, 40 directly adjoining one another (wherein it is also possible to cover the entire surface segment 3 using a suitable number of fields 10, 20, 30, 40, . . . ), are each bounded by a field boundary 11, 21, 31, 41 in the form of a closed traverse each having 4 sides 11.1-4, 21.1-4, 31.1-4, 41.1-4. The corner points of the field boundaries 11, 21, 31, 41 coincide with individual, uniquely identifiable positions 6 of the rivets visible on the real aircraft. Furthermore, the fields 10, 20, 30, 40 are selected so that in each case one side 11.1, 21.1, 31.1, 41.1 of the field boundary 10, 20, 30, 40 extends in parallel to the respective main flow direction of the associated field 10, 20, 30, 40.

The locating of the fields 10, 20, 30, 40, so that all mentioned conditions are met and properties are achieved, is readily possible by way of methods directed thereto and known per se, which can also be carried out in a computer-implemented manner, for example.

On the basis of the fields 10, 20, 30, 40 thus located, subsequently the aerodynamically functional film can be applied to the real aircraft, wherein it is ensured that upon alignment of the aerodynamically functional film in accordance with the main flow direction of the respective field 10, 20, 30, 40, the wall shear stress is effectively reduced over the entire field 10, 20, 30, 40 due to the local flow direction, which deviates at each point in the field 10, 20, 30, 40 only by at most ±5° from the main flow direction.

Figure 4:
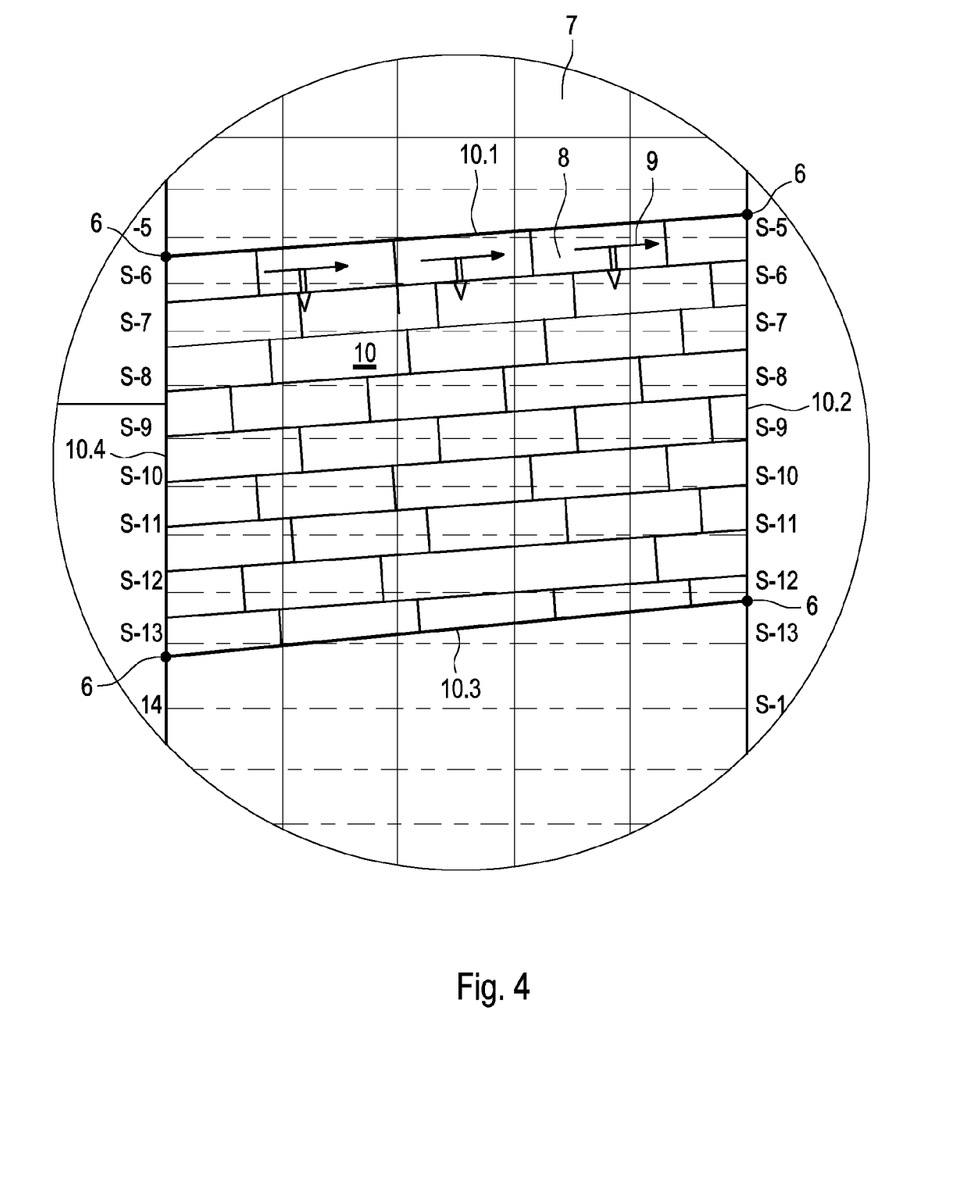
FIG. 4 illustrates an aspect of method on the basis of the surface of the aircraft developed to form a two-dimensional plane comparable to FIG. 3.
Figure 5:
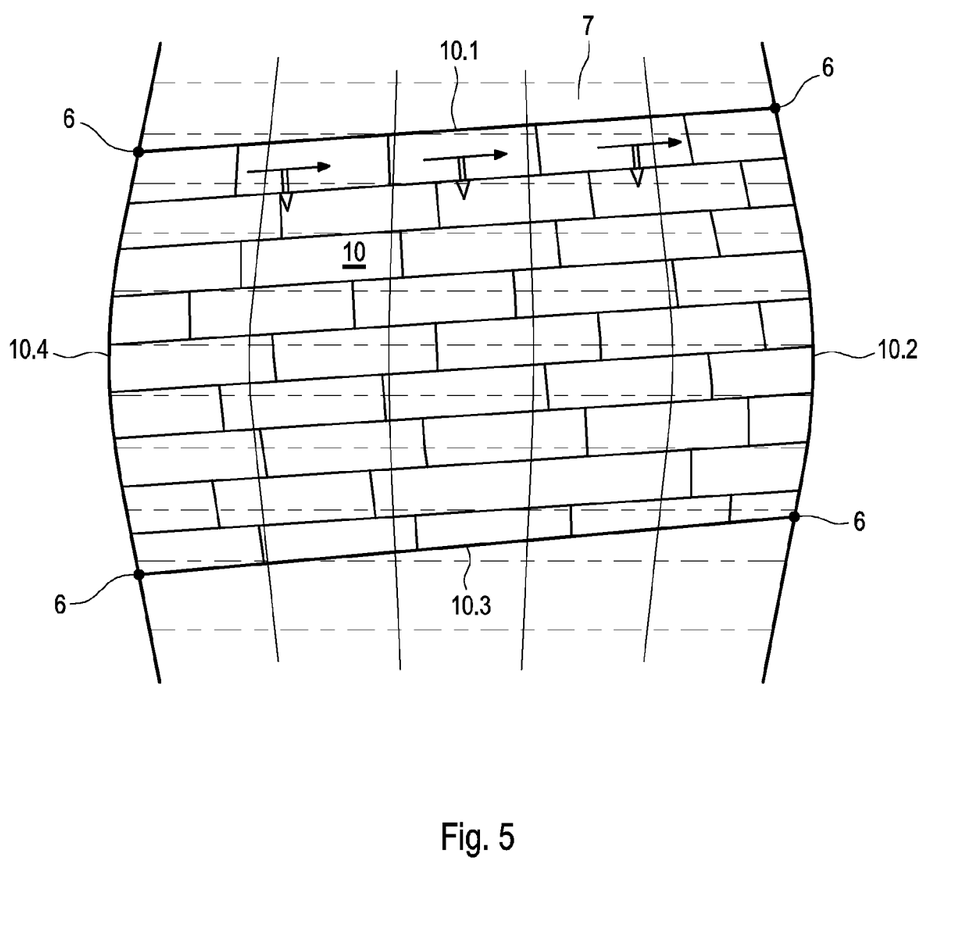
FIG. 5 illustrates a situation on the three-dimensionally formed surface having accompanying distortions in a top view.

The application and trimming of the aerodynamically functional film is described by way of example for the field 10 on the basis of FIGS. 4 and 5, wherein FIG. 4 shows the procedure on the basis of the surface 7 of the aircraft developed to form a two-dimensional plane comparable to FIG. 3, while FIG. 5 indicates the situation on the three-dimensionally formed surface 7 having the accompanying distortions in the top view.

Firstly those rivets on the surface 7 are determined which correspond to the positions 6 which define the field boundary 11 of the located field 10. Subsequently, the individual points are marked by adhesive strips attachable to the surface 7. Since the field boundaries 11 are linear in the two-dimensional development, it is also easily possible to locate the associated alignment lines on the three-dimensional surface 7. This is because the alignment line extends on the three-dimensional surface 7 on the shortest path along the surface 7 between each two of the positions 6, even if the alignment line thus found possibly does not appear linear in the top view depending on the perspective.

Along that field boundary 10.1 which extends in parallel to the main flow direction of the field 10, it is sufficient to only provide adhesive tape for marking the alignment line, while knifeless tapes are provided along the other field boundaries 10.2, 10.3, 10.4.

Subsequently, starting from the field boundary 10.1, film sections 8 of an aerodynamically functional film having a microstructured surface in the form of riblets are applied in the form of tiles to the surface 7, wherein the preferred direction 9 of the film sections 8 or the direction in which the riblets extend is aligned in parallel to the field boundary 10.1, which is possible without problems—if the riblets extend in parallel to the edge of the film section 8.

The film sections 8 are applied in succession like tiles to the surface 7 within the field 10, wherein it is not critical if individual film sections 8 protrude over the field boundaries 10.2, 10.3, 10.4: If the field 10 is completely covered by film sections 8, possibly protruding parts can be removed without problems with the aid of the knifeless tapes along the field boundaries 10.2, 10.3, 10.4.

The application of the aerodynamically functional film explained on the basis of FIGS. 4 and 5 is subsequently carried out for the remaining fields 20, 30, 40 (cf. FIG. 3).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for applying an aerodynamically functional film to a body around which complex flow occurs, the method comprising:
   determining flow lines on a surface of the body around which flow occurs for a predetermined surrounding flow state on a basis of a computer model of the body-using a numerical flow simulation;
   developing at least one surface segment of the computer model provided with flow lines to form a two-dimensional surface;
   locating at least one coherent field in the developed surface segment having local flow directions readable at the flow lines in a predetermined angle range around a main flow direction of the respective field; and
   applying the aerodynamically functional film to the body around which flow occurs within the field boundary of the at least one field located in the developed surface segment in such a way that the aerodynamically functional film is aligned along the main flow direction of the respective field.

2. The method as claimed in claim 1, wherein the field boundary and the alignment of the main flow direction are selected in accordance with alignment lines identifiable on the body, so that alignment of the aerodynamically functional film in the field takes place on the basis of the correspondingly identified alignment lines on the body.

3. The method as claimed in claim 2, wherein the alignment lines are identified on a basis of structural features of the surface of the body, which are mapped in the computer model, or on a basis of a geometrically calibrated pattern projected on the body.

4. The method as claimed in claim 2, wherein the alignment lines include edges or gaps in the surface of the body.

5. The method as claimed in claim 1, wherein the main flow direction of the field is selected in parallel to an alignment line for the field boundary of the field.

6. The method as claimed in claim 5, wherein the method further comprises trimming of the aerodynamically functional film, and before application of the aerodynamically functional film, one or more knifeless tapes are applied along the alignment line of at least one field boundary of the field on the body.

7. The method as claimed in claim 1, wherein the field boundary of the at least one field on the developed surface segment comprises straight lines.

8. The method as claimed in claim 7, wherein the field boundary of the at least one field on the developed surface segment forms a closed traverse having at most 8, 6, or 4 sides.

9. The method as claimed in claim 1, wherein the aerodynamically functional film is applied in at least one field in the form of film sections as tiles.

10. The method as claimed in claim 1, wherein the predetermined angle range is $\pm 7°$ or less, $\pm 5°$ or less, or $\pm 3°$ or less.

11. The method as claimed in claim 1, wherein at least two adjoining fields are located in the surface segment.

12. The method as claimed in claim 1, wherein sufficiently many fields are located that the at least one surface segment is completely filled with fields.

13. The method as claimed in claim 1, wherein the aerodynamically functional film has a riblet structure.

14. The method as claimed in claim 1, wherein developing the at least one surface segment of the computer model provided with flow lines to form the two-dimensional surface includes selecting the at least one surface segment that has a Gaussian curvature of 0.

* * * * *